United States Patent [19]
Wisor et al.

[11] Patent Number: 5,606,713
[45] Date of Patent: Feb. 25, 1997

[54] SYSTEM MANAGEMENT INTERRUPT SOURCE INCLUDING A PROGRAMMABLE COUNTER AND POWER MANAGEMENT SYSTEM EMPLOYING THE SAME

[75] Inventors: Michael T. Wisor; Rita M. O'Brien, both of Austin, Tex.

[73] Assignee: Advanced Micro Devices, Inc., Sunnyvale, Calif.

[21] Appl. No.: 554,396

[22] Filed: Nov. 6, 1995

Related U.S. Application Data

[63] Continuation of Ser. No. 190,597, Feb. 2, 1994, abandoned.

[51] Int. Cl.$^6$ .................. G06F 1/28; G06F 1/30; G06F 13/18; G06F 13/22
[52] U.S. Cl. .................. 395/800; 395/750; 395/182.2; 395/182.22; 364/DIG. 1; 364/DIG. 2; 340/663
[58] Field of Search .................. 395/182.22, 185.08, 395/800, 550, 750, 700, 182.2; 364/DIG. 1, 483, DIG. 2, 492, 140, 145, 464.04; 340/825.08, 663; 455/127, 117

[56] References Cited

U.S. PATENT DOCUMENTS

| | | | |
|---|---|---|---|
| 4,099,232 | 7/1978 | Mensch, Jr. ........................... | 395/550 |
| 4,307,455 | 12/1981 | Juhasz et al. ....................... | 395/182.22 |
| 4,348,743 | 9/1982 | Dozier ................................. | 395/550 |
| 4,460,870 | 7/1984 | Finger ................................. | 324/429 |
| 4,707,795 | 11/1987 | Alber et al. ......................... | 364/550 |
| 4,761,824 | 8/1988 | Saito .................................. | 340/663 |
| 4,868,832 | 9/1989 | Marrington et al. ................. | 371/66 |
| 5,032,825 | 7/1991 | Kuznicki ............................ | 340/636 |
| 5,047,987 | 9/1991 | Kosuge ............................... | 371/66 |
| 5,266,736 | 11/1993 | Saito ................................. | 84/668 |

FOREIGN PATENT DOCUMENTS

WO93/01542  1/1993  WIPO.

OTHER PUBLICATIONS

John Gallant, "Low-power μPs simplify design of portable computers", Apr. 29, 1993, vol. 38 No. 9, pp. 39–48.
Graham Conn, "The SCC68070: a monolithic 68000 CPU and peripherals", 1987, vol. 8 No. 2, pp. 95–100.

*Primary Examiner*—Daniel H. Pan
*Attorney, Agent, or Firm*—Conley, Rose & Tayon P.C.; B. Noel Kivlin

[57] ABSTRACT

A periodic system management interrupt (SMI) source is provided that includes a programmable timer for asserting an SMI a predetermined rate. A microprocessor is coupled to a periodic SMI source through a CPU local bus. The periodic SMI source may be programmed by executing an I/O write cycle which allows a count value and an enable bit to be loaded into an internal configuration register. When the enable bit is set, the programmable timer asserts a periodic system management interrupt at a fixed rate as determined by the count value within the configuration register. The periodic system management interrupt may be asserted, for example, at intervals of 16 milliseconds, 64 milliseconds, 245 milliseconds, 1 second, 16 seconds, or 1 minute. The periodic SMI source allows for the automatic generation of a periodic system management interrupt independently of software.

5 Claims, 1 Drawing Sheet

SYSTEM MANAGEMENT INTERRUPT SOURCE INCLUDING A PROGRAMMABLE COUNTER AND POWER MANAGEMENT SYSTEM EMPLOYING THE SAME

This application is a continuation of application Ser. No. 08/190,597, filed Feb. 2, 1994, now abandoned.

BACKGROUND OF THE INVENTION

1. Field of the Invention

This invention relates to computer systems and more particularly to system management interrupt sources employed within computer systems.

2. Description of the Relevant Art

Interrupt-driven computer systems provide a mechanism that allows a hardware signal to force the software to change its path of execution. The first step a microprocessor takes to process an interrupt is to save the program counter (usually on the stack, an area of memory pointed to by the microprocessor's stack pointer that operates in a last-in-first-out fashion). This allows the software to return to normal program flow at the point at which it was interrupted by loading the saved value from the stack into the microprocessor's program counter. Some microprocessors automatically save other registers (such as the accumulator or index pointer) in addition to the program counter. The actual interrupt processing begins when the microprocessor jumps to the interrupt service routine. The interrupt service routine is a subset of software code that services the interrupt.

If the microprocessor hardware cannot distinguish between various interrupt sources, then the interrupts are called non-vectored. For non-vectored interrupts, the interrupt service routine must test (poll) each of the possible interrupt sources to determine which device generated the interrupt. A faster scheme involves vectored interrupts, which allow an interrupting device to identify itself by driving an ID code on the data bus during an interrupt acknowledge cycle at the beginning of the interrupt processing. The microprocessor then executes the indicated interrupt service routine.

Microprocessors such as the particularly popular models 80386 and 80486 microprocessors include an input terminal (INT) for receiving an interrupt signal. Computer systems that include multiple interrupting devices frequently employ programmable interrupt controllers that allow software prioritizing and masking of the various interrupt sources. Exemplary interrupt sources include keyboards, printers, and real time clocks.

Most microprocessors also employ a non-maskable interrupt (NMI) which cannot be disabled by software. This interrupt is usually processed at the end of the current instruction execution. It is typically used for relatively high-priority error interrupts, such as an abort signal or power-failure detection.

Yet another type of interrupt is a system management interrupt (SMI). A system management interrupt is typically treated with a higher priority than both non-maskable interrupts and standard interrupts. System management interrupts are used to initiate and/or maintain various system management functions, such as, for example, power management.

One problem associated with a typical computer system is the inability to automatically generate a periodic system management interrupt. Such a periodic system management interrupt would be particularly desirable when used in conjunction with power management functions that require high priority servicing at regular intervals and with minimal processing overhead. Since the typical computer system does not employ a flexible periodic system management interrupt source, overall functionality of the system is limited and/or software itself must manage and control the intervals between power management servicing. Thus, a greater burden may be imposed upon the system management software and the performance thereof may be degraded.

SUMMARY OF THE INVENTION

The problems outlined above are in large part solved by periodic SMI source including a programmable timer according to the present invention. In one embodiment, a microprocessor is coupled to a periodic SMI source through a CPU local bus. The periodic SMI source may be programmed by executing an I/O write cycle which allows a count value and an enable bit to be loaded into an internal configuration register. When the enable bit is set, the programmable timer asserts a periodic system management interrupt at a fixed rate as determined by the count value within the configuration register. The periodic system management interrupt may be asserted, for example, at intervals of 16 milliseconds, 64 milliseconds, 245 milliseconds, 1 second, 16 seconds, or 1 minute. The periodic SMI source allows for the automatic generation of a periodic system management interrupt independently of software. Accordingly, system management service routines may be prompted for execution at a programmable rate with minimal system overhead.

One computer system that employs the periodic SMI source includes a power management subsystem for tracking the capacity of a battery which provides power to the computer system. A value indicative of the voltage of the battery may be read through an I/O port coupled to a battery monitor. The periodic SMI source asserts a system management interrupt signal at a predetermined rate which causes the power management subsystem to read the I/O port upon each asserted interrupt signal. The power management subsystem uses the information read from the I/O port to update the estimated remaining capacity of the battery.

Broadly speaking, the present invention contemplates a computer system comprising a microprocessor including an interrupt input terminal and a system management interrupt source coupled to the interrupt input terminal. The system management interrupt source includes a programmable counter capable of asserting a system management interrupt signal at predetermined periodic rate.

The present invention further contemplates a system management interrupt source for a computer system including a microprocessor having an interrupt input terminal. The system management interrupt source comprises a programmable counter capable of asserting a system management interrupt signal at a predetermined rate, a configuration register for storing a count value indicative of a predetermined periodic rate, and a decoder coupled to the configuration register and capable of causing the count value to be stored within the configuration register.

The present invention finally contemplates a computer system comprising a microprocessor including an interrupt input terminal, a battery for providing power to the computer system, a battery monitor coupled to the battery for monitoring an output voltage level of the battery, and an I/O port coupled to the battery monitor, wherein the microprocessor is capable of reading a digital value at the I/O port that is indicative of the output voltage level. The computer system further comprises a power management subsystem for tracking an estimated capacity value of the battery and a system management interrupt source coupled to the interrupt input terminal and including a programmable counter capable of asserting a system management interrupt signal at a predetermined rate. The microprocessor reads the digital value at the I/O port in response to each assertion of the system management interrupt signal.

BRIEF DESCRIPTION OF THE DRAWINGS

Other objects and advantages of the invention will become apparent upon reading the following detailed description and upon reference to the accompanying drawing in which.

Figure 1:
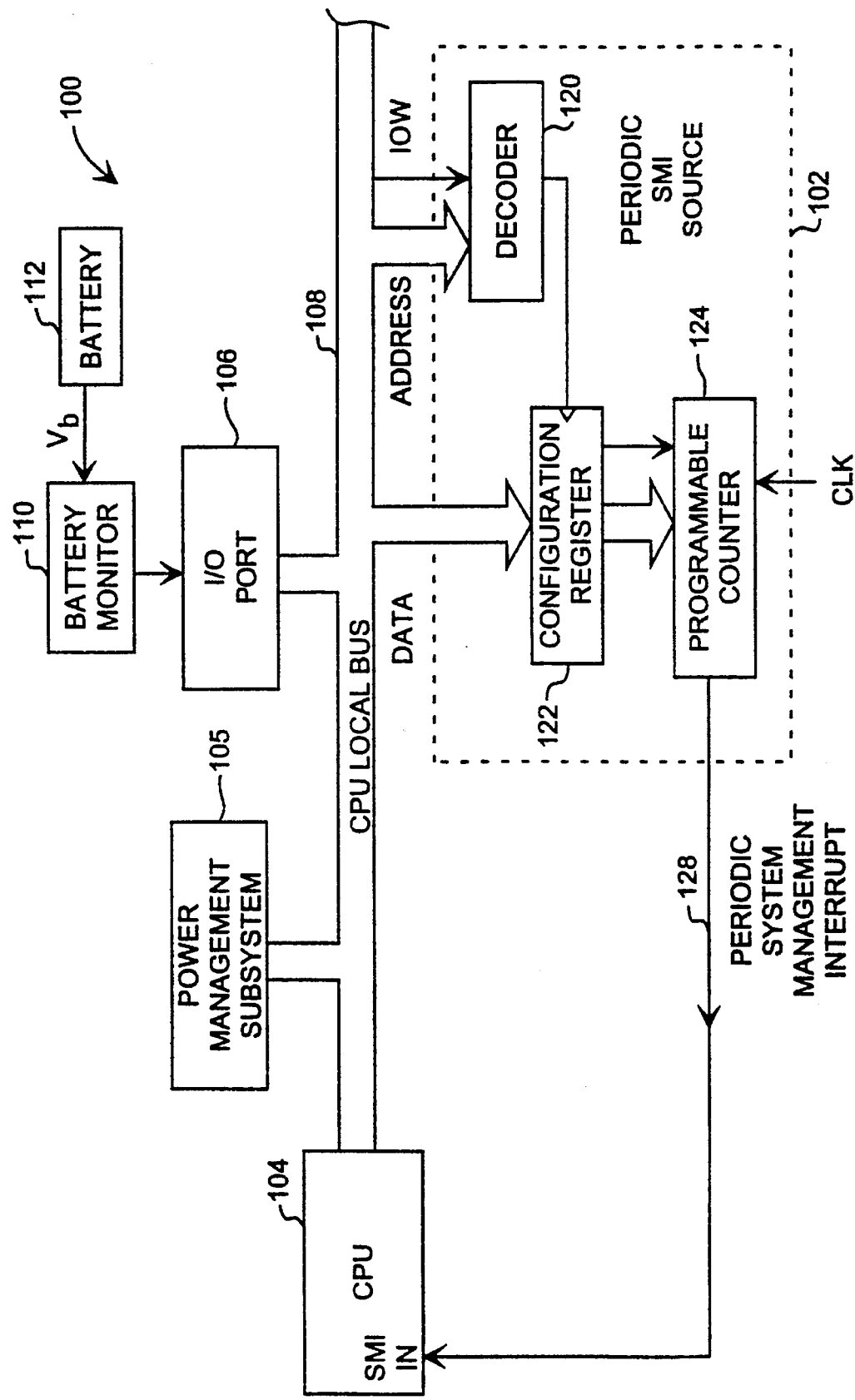
FIG. 1 is a block diagram of a computer system including a periodic SMI source according to the present invention.

While the invention is susceptible to various modifications and alternative forms, specific embodiments thereof are shown by way of example in the drawing and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawing, FIG. 1 is a block diagram of a computer system 100 that employs a periodic system management interrupt (SMI) source 102 according to the present invention. In addition to the periodic SMI source 102, the computer system 100 further includes a microprocessor (CPU) 104, a power management subsystem 105, and an I/O (input/output) port 106 coupled to periodic SMI source 102 via a CPU local bus 108. The computer system 100 is finally illustrated with a battery monitor 110 coupled between I/O port 106 and a battery 112.

Microprocessor 104 is a data processing unit that implements a predetermined instruction set and is exemplary of, for example, a model 80486 microprocessor. Power management subsystem 105 is provided to regulate and minimize the overall power consumption of computer system 100, and may be implemented via hardware, software, or a combination thereof. In the embodiment of FIG. 1, power management subsystem 105 includes a so-called "fuel gauge" that estimates and tracks the capacity of battery 112.

Battery 112 provides power to the computer system 100. Battery monitor 110 and I/O port 106 are provided to allow the power management subsystem 105 to read a value indicative of the output voltage $V_b$ of battery 112. Specifically, battery monitor 110 converts the analog voltage value of battery 112 to a digital value that can be read through I/O port 106 by power management subsystem 105. Power management subsystem 105 includes software code that reads I/O port 106 upon the assertion of a system management interrupt signal at the SMI IN terminal of microprocessor 104. Following the read of I/O port 106, power management subsystem 105 processes the digital value (representative of the battery voltage $V_b$) to determine the remaining capacity of battery 112. Specific techniques for estimating battery capacity based on output voltage are well-known.

The generation of the periodic system management interrupt signal is next explained. Periodic SMI source 102 includes a decoder 120, a configuration register 122, and a programmable counter 124. As will be understood from the description below, periodic SMI source 102 is provided to automatically assert the periodic system management interrupt signal at a selected fixed rate.

The periodic SMI source 102 is initialized by executing a write cycle to the I/O addressable space of computer system 100 to which configuration register 122 is mapped. Specifically, a programmer may execute an I/O write cycle with an address signal that corresponds to configuration register 122. Decoder 120 receives this address signal along with the I/O write strobe signal IOW and responsively causes configuration register 122 to latch and store the initialization data provided on the data lines of CPU local bus 108. In one embodiment, three bits of the initialization data provided to configuration register 122 controls the count value of programmable counter 124. A fourth bit (i.e., an enable bit) enables the programmable counter 124. Once the enable bit is set, programmable counter 124 repetitively counts to the count value stored within register 122 and resets. Upon each count cycle of programmable counter 124, the system management interrupt signal at line 128 is asserted. Depending upon the count value stored within configuration register 122, the system management interrupt signal is asserted at intervals of 16 milliseconds, 64 milliseconds, 245 milliseconds, 1 second, 16 seconds, or 1 minute. When microprocessor 104 receives the system management interrupt signal, the microprocessor 104 jumps to the system management interrupt routine which causes power management subsystem 105 to read I/O port 106. As explained previously, power management subsystem 105 uses the digital value read from I/O port 106 to determine the remaining capacity of battery 112.

In accordance with the computer system 100 employing the periodic SMI source 102 as described above, a system management interrupt signal is generated at a predetermined and programmable periodic rate. The periodic SMI source 102 allows for the programming of a wide range of periodic rates, and frees the microprocessor 104 and the power management subsystem 105 from associated timekeeping tasks. Accordingly, system management functions may be initiated and executed at regular intervals with minimal processing overhead.

It is noted that the periodic system management interrupt source as described above may be used in conjunction with an immediate system management interrupt source as described within the copending, commonly assigned patent application entitled "Immediate System Management Interrupt Source with Associated Reason Register", by Wisor, et al., Ser. No. 08/190,285, filed concurrently herewith. The periodic system management interrupt source as described above may further be employed within a computer system that incorporates the circuitry and techniques described within the copending, commonly assigned patent applications: "Power Managment Message Bus for Integrated Processor", by Gephardt, et al., Ser. No. 08/190,279, filed concurrently herewith; "Power Management Unit Including Software Configurable State Register and Time-Out Counters for Protecting Against Misbehaved Software", by O'Brien, et al., Ser. No. 08/190,279, now U.S. Pat. No. 5,504,910, filed concurrently herewith; and "Power Management System for an Integrated Processor", by O'Brien, et al., Ser. No. 08/190,292, now U.S. Pat. No. 5,511,203, filed concurrently herewith. The above copending and commonly assigned patent applications are incorporated herein by reference in their entirety.

Numerous variations and modifications will become apparent to those skilled in the art once the above disclosure is fully appreciated. It is intended that the following claims be interpreted to embrace all such variations and modifications.

What is claimed is:

1. A computer system comprising:

a microprocessor including a system management interrupt input terminal and a general purpose interrupt input terminal, wherein said microprocessor is configured to process an interrupt received at said system management interrupt input terminal with a higher priority and with precedence over an interrupt simultaneously received at said general purpose interrupt input terminal;

a system management interrupt source coupled to said system management interrupt input terminal, wherein said system management interrupt source includes:

a programmable counter capable of asserting a system management interrupt signal at a predetermined periodic rate independent of other system activity as long as an enable bit is set;

a configuration register coupled to said programmable counter and capable of receiving a count value indicative of said predetermined periodic rate during an I/O write cycle generated by said microprocessor, wherein said configuration register includes a storage location for storing said enable bit, and wherein an output of said storage location is coupled to said programmable counter whereby said enable bit selectively enables said programmable counter;

a decoder coupled to said configuration register for decoding an address signal during said I/O write cycle and for causing said count value to be stored within said configuration register;

a battery for providing power to said computer system;

a battery monitor coupled to said battery for monitoring an output voltage level of said battery;

an I/O port coupled to said battery monitor for reading a digital value indicative of said output voltage level; and a power management subsystem associated with said microprocessor, wherein said microprocessor causes said power management subsystem to read said digital value indicative of said output voltage level from said I/O port in response to the assertion of said system management interrupt signal.

2. The computer system as recited in claim 1 wherein said microprocessor is coupled to said system management interrupt source via a CPU local bus.

3. The computer system as recited in claim 1 wherein said power management subsystem is further capable of tracking an estimated capacity value of said battery.

4. The computer system as recited in claim 1 wherein said programmable counter is programmable such that said system management interrupt signal is asserted at intervals ranging from 16 milliseconds to 1 minute.

5. The computer system as recited in claim 1 wherein said decoder further receives an I/O write signal.

* * * * *